United States Patent [19]

Quere et al.

[11] 4,223,370

[45] Sep. 16, 1980

[54] PLUGGABLE MINIATURE RELAY

[75] Inventors: Eugène M. Quéré, Brunoy; Pierre M. Le Rolland, Le Plessis Trevise, both of France

[73] Assignee: ITT Industries, Inc., New York, N.Y.

[21] Appl. No.: 876,804

[22] Filed: Feb. 10, 1978

[30] Foreign Application Priority Data

Feb. 10, 1977 [FR] France ............................... 77 03768

[51] Int. Cl.[2] ............................................... H02B 1/10

[52] U.S. Cl. .................................... 361/331; 361/357; 335/202; 200/51 R; 339/17 CF

[58] Field of Search ..................... 200/51 R, 281, 293, 200/294; 361/331, 357, 390, 391, 392, 395, 403, 394, 429, 334; 335/202; 339/17 CF; 174/52 FP

[56] References Cited

U.S. PATENT DOCUMENTS

| | | | |
|---|---|---|---|
| 3,353,173 | 11/1967 | Beilfuss | 361/394 |
| 3,737,729 | 6/1973 | Carney | 361/395 |
| 3,949,276 | 4/1976 | Reuting | 335/202 |
| 4,002,955 | 1/1977 | Eggert et al. | 361/391 |
| 4,080,032 | 3/1978 | Cherian et al. | 339/17 CF |
| 4,125,887 | 11/1978 | Reuting | 361/357 |
| 4,130,327 | 12/1978 | Spaulding | 339/17 CF |

*Primary Examiner*—Gerald P. Tolin
*Attorney, Agent, or Firm*—John T. O'Halloran; Jeffrey P. Morris

[57] ABSTRACT

Pluggable miniature relay comprising a plug-in socket connector; the base of which has a complementary configuration to that of the base of the relay. Two walls of the connector ensure the housing of the contact springs which are soldered by an end on the mounting support (printed circuit board) and set up by the other end the electric contact with the relay electrodes. The other two walls have locking studs which home in the recesses of the relay cover, when the relay is plugged-in on the socket connector, and hold it locked on the latter.

6 Claims, 9 Drawing Figures

Figure 1:
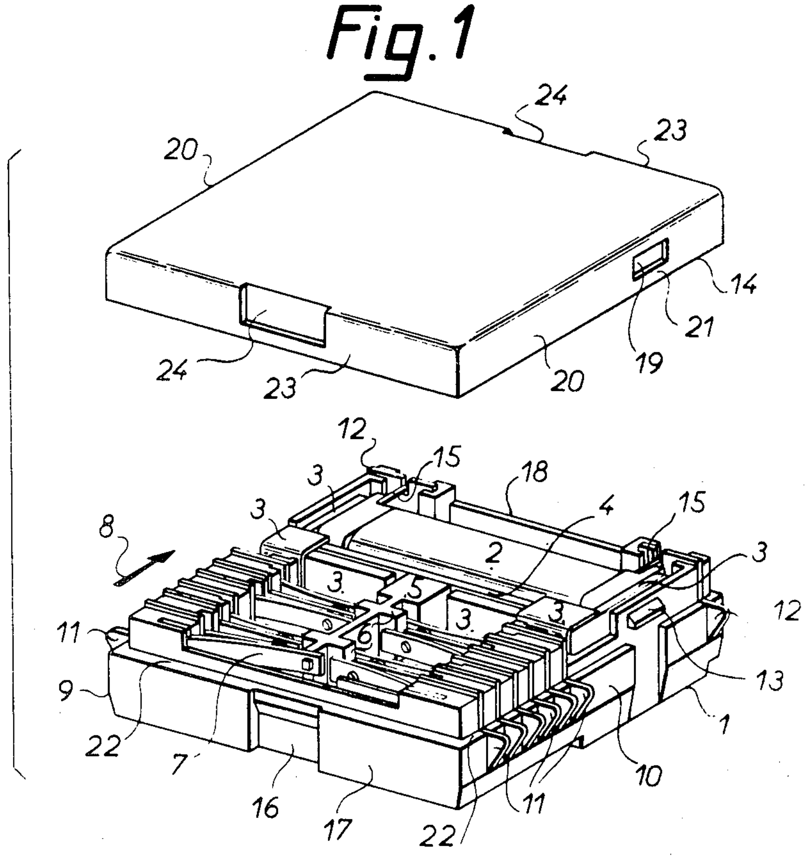

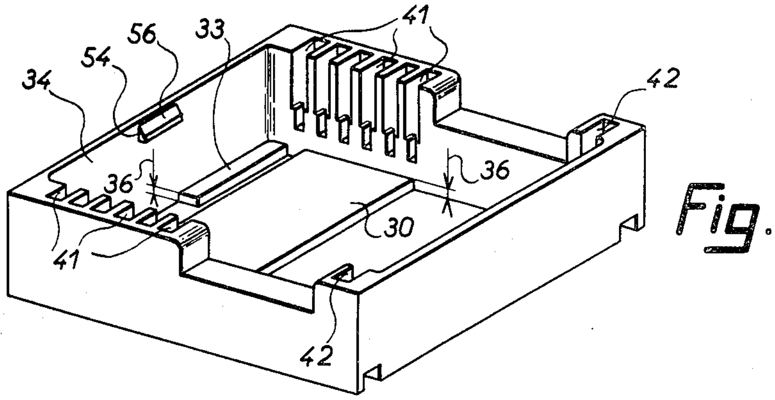
Fig. 5
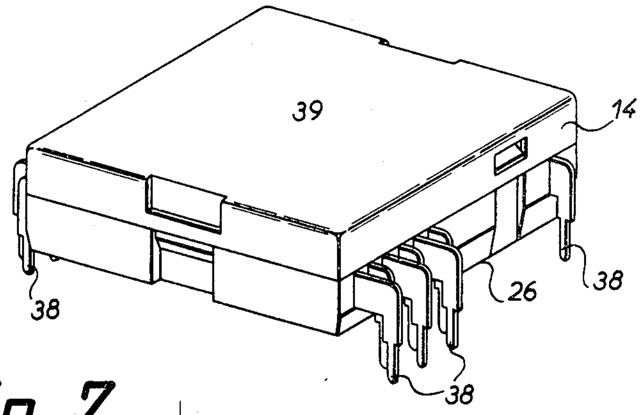
Fig. 6
Fig. 7
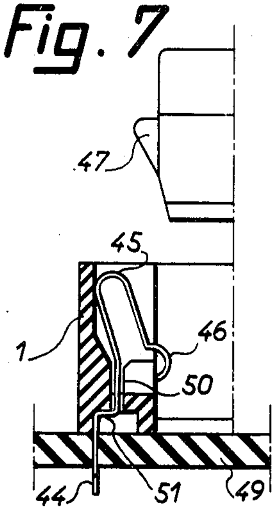
Fig. 8
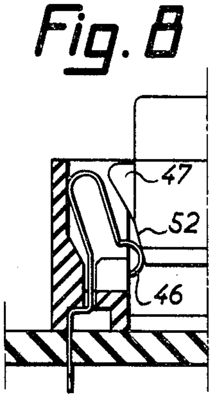
Fig. 9
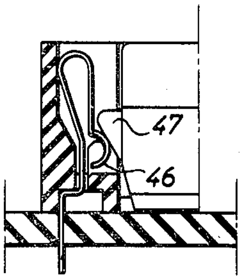

PLUGGABLE MINIATURE RELAY

The present invention concerns a pluggable miniature relay and, more particularly, a miniature relay intended to be mounted on a printed circuit board either directly, or by means of a plug-in socket connector, the thickness requirement with respect to the printed circuit board remaining the same whether the relay is plugged on the socket or not.

Relays are electromechanical components widely used in numerous fields of activity. However, with the development of reliable and inexpensive electronic components, more and more installations are made in the electronic version because, notably, of the gain in space obtained with respect to the electromechanical version of the same installations. Now, in electronic installations, it is known that printed circuit boards are used which serve as supports and wiring for the electronic components used. Still for minimal space reasons, but taking into account other criteria such as heat dissipation, a means has been sought to bring the printed circuit boards as close together as possible; this is why boards are found with an assembly pitch between ten and fifteen millimeters. But is some applications, these electronic installations need to use electromechanical relays for reasons which may be due, for instance, to the high intensity of the current to be supplied, to the current breaking capacity required in a given switching. This therefore raises the problem of obtaining an electromechanical relay that can be integrated in electronic equipment, in other words, that can be mounted on a printed circuit board without by this modifying the assembly pitch of the boards.

Relays of this kind, referred to as "miniatures", are known of which all the constituent parts are arranged in a plastic support closed with a cover. The coil and the contact springs are then connected to pins which go through the base of the support, these pins being intended to be soldered to the printed configuration of the board. It is therefore seen that the thickness requirement is a critical parameter.

However, direct connection by soldering of such a miniature relay on a printed circuit board does not always give the desired using flexibility. Indeed, in the case when it is wanted to repair, modify, or change such a relay, it is necessary to pull out its supporting board and to unsolder the connecting pins; this cannot be done without a certain number of inconveniences which can be eliminated without difficulty by using a "pluggable" version of the relay. This version consists in soldering on the printed circuit board, not the relay itself, but a socket connector having electric connecting and mechanical holding parts so as to permit mounting of the relay by mere plugging-in on the socket connector and its dismounting just as easily.

Nevertheless, the problem which is then raised is that of the thickness requirement. Indeed, as the socket has a base resting against the printed circuit board, this requirement is obviously different depending on whether the relay is mounted directly on the board or plugged into its socket.

The object of the invention is to obviate such a drawback by proposing a relay and a plug-in socket connector which permits direct or plugged-in mounting on the printed circuit board without either one of these mounting versions modifying the thickness requirement.

For this purpose, the invention foresees that the base of the plug-in socket connector comprises openings the shapes and dimensions of which are similar to the shapes and dimensions of the corresponding protruding parts offered by the base of the relay support. In the same way, the solid parts forming the base of the socket and ensuring its rigidity are foreseen to fit exactly in shape to the corresponding recesses of the base of this support. Thus, when the relay is plugged-in on the socket, the base of the relay support is on the same plane as the base of the socket, so that the thickness requirement remains the same, whether the relay is soldered directly onto the board or mounted on its socket connector.

In addition, two of the socket connector walls have contact springs one end of which is intended to be soldered on the board and the other end of which ensures the electric contact, when the relay is plugged-in, with the external electrodes of the relay which are associated with the contact springs of the same relay and its coil. The other two walls of the socket permit locking the relay after plugging-in; for this purpose, they each have a stud which slides in a guiding groove of the relay support during plugging-in and falls back, by snapping, into a recess made in the relay cover when the relay is in the correct plugging-in position.

Various other features will emerge in the description that follows, given as a non-limiting example, and by referring to the accompanying figures which represent:

FIG. 1, a view in perspective of the relay support, of its constituent parts and of the protecting cover in conformity with the invention.

Figure 2:
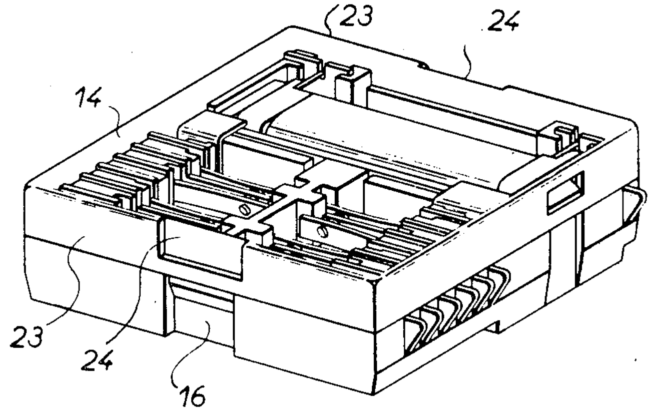

FIG. 2, a view in perspective of the miniature relay of the invention in its pluggable version.

Figure 3:
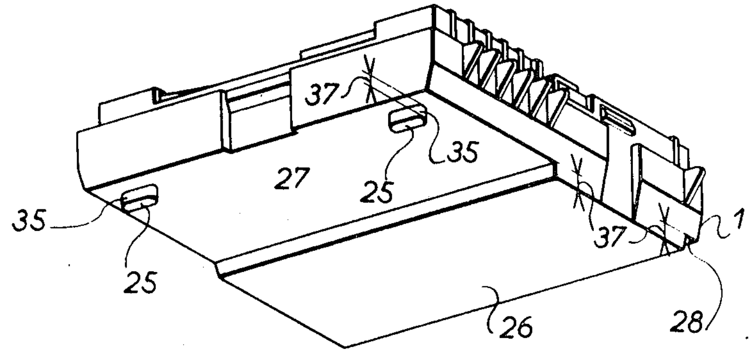

FIG. 3, a view in perspective of the base of the relay support.

Figure 4:
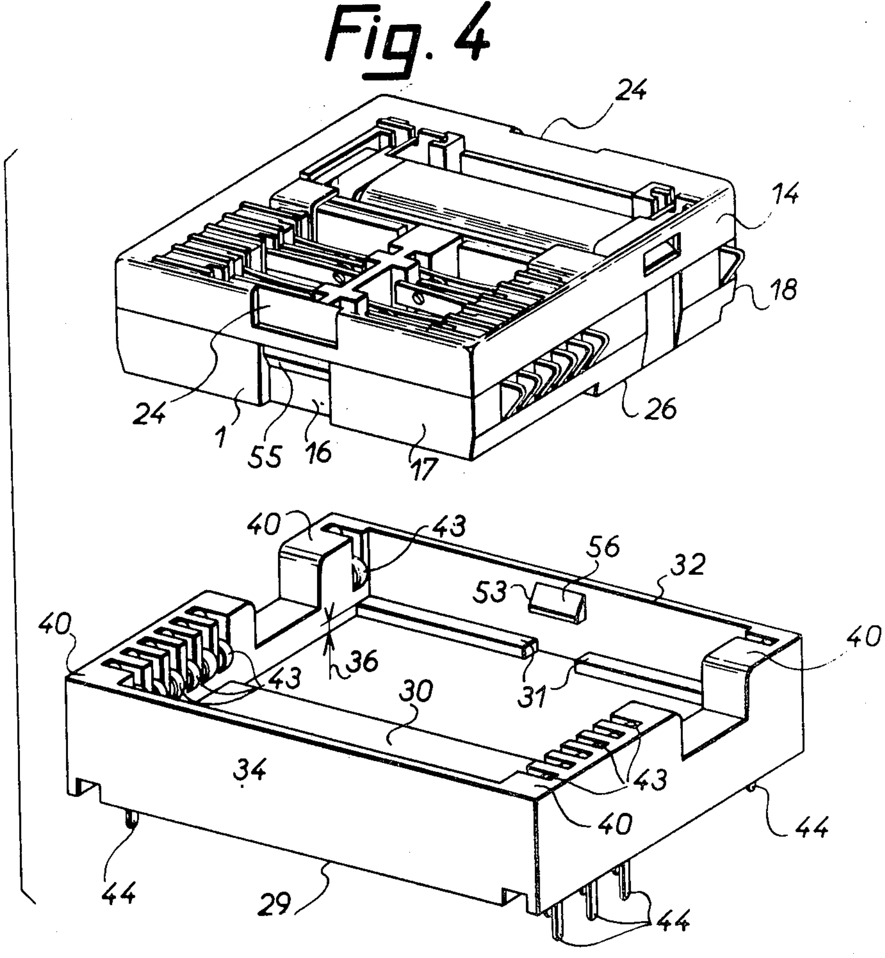

FIG. 4, a view in perspective of the relay of FIG. 2 and of the plug-in socket connector in conformity with the invention.

FIG. 5, a view in perspective of the unequipped plug-in socket connector, from a different angle to that of FIG. 4.

FIG. 6, a view in perspective of the miniature relay in its pin version for direction connection in a printed circuit board.

FIGS. 7 to 9, schematic views showing the various phases of the relay plug-in on its socket operation.

The description will start by first of all referring to FIG. 1 which shows some of the constituent sub-assemblies of the invention, namely the relay itself and its cover. As far as the different electromechanical parts of the relay are concerned, there are not particularly characteristic and will be briefly recalled. They essentially comprise the coil 2 and its magnetic circuit made up by the parts of the yoke referenced 3 and the moving armature made up by plate 4. Armature 4 is integral with guide 5 which, in the example given by the Figure, operates two groups of two change-over contacts. For this purpose, guide 5 presents, opposite each group of contacts, an arm 6 which enters between the two lever springs of this group of contacts. A return spring 7 exerts, on the end of guide 5, a force in the direction shown by arrow 8. Thus, when coil 2 is energized, armature 4 is drawn against yoke 3. Consequently, it moves in the opposite direction to that of the arrow 8 and transmits its movement to guide 5, the arms 6 of which act on the lever springs of the group of contacts. It is known that, when coil 2 is no longer energized, return spring 7 brings pressure to bear on guide 5 and brings back armature 4 as well as the contacts into the unoperating position of FIG. 1.

These different electromechanical parts are arranged in a support 1 of moulded material comprising a base integral with four walls. Two of these walls—walls 9 and 10—are similar; they ensure the housing of electrodes 11 and 12 and carry stud 13 serving to lock cover 14. Electrodes 12 enable connection by soldering of the coil leads. Electrodes 11, respectively associated in a suitable way with the contact springs, are in through connection with the latter. A recess 16 is foreseen on wall 17, the same as on wall 18 although this cannot be seen on the Figure. It serves for guiding the relay locking device on its socket connector as will be seen later.

Cover 14 is intended to protect from dust the electromechanical parts of the relay, among others. It is therefore foreseen to be placed on the relay—or removed—in a very simple way, by snapping, without requiring a tool. In order to do this, it merely has a window 19 in each of its sides 20. Thus, when cover 14 is placed on support 1, part 21 slides on the bevelled face of stud 13, bends flexibly until it can regain its original position when stud 13 finds its place in window 19. In this position, the sides of cover 14 abut against shoulder 22 of support 1. Such a situation corresponding to that of the relay equipped with its cover is shown on FIG. 2. It will be noted that this cover can be of transparent or opaque plastic, the case shown on the Figure being that in which a transparent cover is used. It should also be noted that on each of sides 23 of cover 14 there is a recess 24 which prolonges recess 16 of socket 1 and the role of which will be explained later.

The description will now be continued by explaining how the miniature relay as shown on FIG. 2 is mounted on its plug-in socket connector. Nevertheless, in order to show the means used in order for the relay plugged-in on its socket connector to keep the same thickness as when it is not, reference will first of all be made to FIG. 3 which is a view of the base of the same support 1 as has been described in the text on FIG. 1. As it can be noted, the base of the support is not flat but offers cut-outs and protruding parts which are situated in two parallel planes and result in support 1 not having uniform thickness. It is in this way that the thickest part is provided by faces 25 and 26 which are in one of these planes, the other plane corresponding to faces 27 and 28 and to the thinnest part of the support. It will be noted that the thickest part of the base delimited by face 26 has been chosen judiciously so that it permits easier housing of coil 2 (FIG. 1), the yoke and armature 4 which are the thickest constituent parts of the relay.

Reference will now be made to FIG. 4 on which the relay of FIG. 2 can be seen in the position it occupies when it is ready to be plugged-in on socket connector 29. However, before explaining the conditions in which the plugging-in is carried out, this socket connector will be described. It is essentially comprised of four walls and of a base made up of several parts; some of these are visible on FIG. 4 or else on FIG. 5 which is a view of socket connector 29 from another angle to that of FIG. 4. The parts in question are cross-piece 30 (FIGS. 4 and 5) and two pairs of stiffeners, one comprising stiffeners 31 (FIG. 4) integral with wall 32, the other stiffeners 33 (FIG. 5) integral with wall 34. It will be noted that the lower faces of these parts—those turned towards the exterior of the socket connector—are situated on the same plane, this plane merging with that in which the lower faces of the socket connector walls are found. The face space which is delimited by the side of the cross-piece 30 and the side of the stiffeners 31 (FIG. 4) forms an opening the dimension of which corresponds to that of the face 26 (FIG. 3) of the relay. In the same way, the opening delimited by the side of cross-piece 30 and the side of stiffeners 33 (FIG. 5) has a dimension in keeping with that of blocks 35 (FIG. 3). Moreover, thickness 36 (FIGS. 4 and 5) of stiffeners 31–33 and cross-piece 30, is similar and it is equal to distance 37 which, for the relay base of FIG. 3, separates the plane in which faces 25 and 26 are found from the plane in which faces 27 and 28 are situated. In addition, by considering the relay itself on FIG. 4, it is seen that cover 14 mounted on support 1 causes no modification in dimensions; support and cover therefore form a homogeneous block making up the miniature relay, the external dimensions of this block corresponding to the housing determined by the internal faces of the walls of socket connector 29.

In this way, and independently of the method used for plugging-in as well as for holding the relay in the socket, it is seen that when the relay is placed correctly in its housing, the openings on the base of the socket connector serve to receive the protruding parts, such as 26 and 35 (FIG. 3) of the relay base while faces 27 and 28 of the same base press against the homologeous faces of cross-piece 30 and stiffeners 31–33. Thus, taking into account what has been written previously concerning the thickness of these different parts, the relay mounted on its socket presents a homogeneous base since faces 25 and 26 of the relay and the lower faces of the cross-piece 30 and stiffeners 31–33 of the socket connector are on the same plane.

It is also worth noting that the way in which the openings and protruding parts cooperate permits obtaining that the thickness necessary for the implantation of the miniature relay on a printed circuit board remains the same whatever mounting solution is adopted, i.e. whether the relay is soldered directly on the board or whether the socket connector is soldered and the relay plugged-in onto it. Indeed, if the Figures have shown up to now a relay with electrodes, such as 11 and 12 (FIG. 1), permitting plugging-in on an appropriate socket, the electrodes which are associated with the relay contact springs can appear in the form shown by FIG. 6 and comprise pins 38 intended to go through a printed circuit board to be soldered to the printed configuration of this card. In this case, it is seen that it is the relay base made up of faces 25 and 26—more visible on FIG. 3—which rests against the printed circuit board. The thickness of the relay is therefore determined by the distance which separates these faces 25–26 from the face 39 of cover 14.

Now by referring again to FIG. 4 and to what has been said of the way in which the protruding parts and openings of the relay and socket bases cooperate, it is seen that face 26–exactly like faces 25 of block 35 (FIG. 3) of the relay—form part of the same plane, the other part of which is made up by the lower faces of the cross-piece 30 and stiffeners 31–33. In reality, this plane represents the base of the relay-socket assembly which rests against the printed circuit board if the pluggable relay solution has been chosen and not that of FIG. 6. As face 39 of the cover is then at the same level as faces 40 of the socket (FIG. 4), it is seen that the minimal thickness requirement of the relay, i.e. the distance separating the free face of the cover from the printed circuit board, remains the same whether the relay is mounted by plugging-in on the socket connector (FIG. 4) or directly on the printed board (FIG. 5).

The description will be continued by now examining the method of plugging-in the relay and holding it on the socket connector by referring, on the one hand, to FIG. 4 but also to the three schematic FIGS. 7, 8 and 9. If FIG. 5 is considered, it is noted that two of the socket walls each have six housings 41 and one housing 42. These housings are foreseen to each receive a spring 43 (FIG. 4), of suitable shape, in material which is a good conductor of electricity, the end 44 of which permits connection by soldering on a printed circuit board. In reality, as can be seen on FIG. 7, each spring 43 comprises a flexible hairpin part 45, which presses against the wall of socket 29. This part 45 is prolonged, on the one hand, towards end 46 foreseen to ensure the electric connection with the corresponding electrode 47 of the relay (electrodes 11 and 12 on FIG. 1) and, on the other hand, towards the end 44 by going through socket 29 and printed circuit board 49. It will be noted briefly that the spring is held in its housing on socket 29 owing to the presence of slot 50 and bending 51.

When the relay is placed on its socket, the phase corresponding to the situation shown on FIG. 4 is represented schematically by FIG. 7. Then, as shown by FIG. 8, sides 52 of the relay support arrive against and progressively push end 46 of the socket springs. Finally, electrodes 47 themselves enter into contact with ends 46 of the springs and push them in their housing until the relay is definitely in place as shown by FIG. 9. It will be noted that the slope given to the bevelled part of electrodes 47 is calculated for the contact pressure exerted by ends 46 to be sufficient but for it to remain compatible with the manual force that must be used by an operator to put the relay in place on its socket without difficulty. It will also be noted that the contact point of end 46 with electrode 47 is displaced during the introduction along end 46, which causes self-wiping of the contact area.

To end the description, an explanation will be given concerning the locking of the relay on its socket by means of FIGS. 4 and 5. Beforehand, it should be remembered that the socket has a stud 53 on wall 32 (FIG. 4) while wall 34 has a similar stud 54 (FIG. 5). In the same way, for the relay, wall 18 which is not visible on the Figures has a recess identical to recess 16 of wall 17, each of these recesses is prolonged by that of the cover, referenced 24. In this way, when the relay has been placed on its socket, studs 53 and 54 are introduced into recesses 16 of the relay. Then bevelled faces 55 of these recesses act progressively on bevelled faces 56 of studs 53 and 54. This results in flexible bending of walls 32 and 34 of the socket until the bottom of the studs arrives level with recesses 24 of the cover. Each stud then homes in its recess 24 while the corresponding wall of socket 29 regains its initial shape. This is then the situation of FIG. 9, the effort exerted by ends 46 on electrodes 47 not being able to push out the relay since the socket studs hold it firmly by anchoring its cover. It goes without saying that, reciprocally, it suffices to free studs 53 and 54 of recesses 24 of the cover—by flexibly bending walls 32 and 34 of socket 29—in order to free the relay and withdraw it from its socket.

It is quite obvious that the preceding description is given only by way of unrestrictive example and that numerous alternatives can be foreseen without departing from the scope of the invention.

We claim:

1. A pluggable miniature relay comprising:

a plug-in socket connector containing a housing having a support which receives electromechanical relay means and said support enclosed by a protecting cover, wherein said plug-in socket connector includes walls having electrical contacts mating with contacts of the relay means and, means anchoring said support to said cover, the base of said socket connector having a configuration in the same plane as the base of said relay support such that a portion of the relay support thickness is substantially identical with the thickness of said socket connector.

2. A pluggable miniature relay according to claim 1, wherein the base of the socket connector comprises one or more openings having shapes and dimensions respectively corresponding to the shapes and dimensions of the corresponding protruding parts of the base of the relay support, and wherein the complementary recesses of the protruding parts of the support base correspond in shape to the solid parts comprising the base of the socket connector.

3. A pluggable miniature relay according to claim 2, wherein the thickness of the protruding parts of the base of the relay support are equal to the thickness of the solid parts comprising the base of the socket connector, such that the base of the relay support is on the same plane as the base of the socket connector such that the thickness of the said relay support is substantially identical to said connector.

4. A pluggable miniature relay according to claim 1, further including an electrical contact wherein two of the walls of the socket connector comprise recess means for receiving and holding said electric contact, to provide a passage towards the base of the socket connector for the part of said electrical contact having an end to be soldered on the connecting support, while having another end of said electrical contact flexible.

5. A pluggable miniature relay according to claim 4, wherein said electrical contact of the pluggable relay protrude from the relay and have a generally triangular shape determining a bevelled part which cooperates with said flexible end of said socket connector contact; the bevelled part of each relay contact pushing progressively said flexible end of each socket connector contact as the relay is placed on the socket, such that the resulting contact pressure is maximal when the relay is in the locked position.

6. A pluggable relay according to claim 1, wherein the means of locking the relay support on the plug-in socket connector comprise an anchoring stud having a bevelled face disposed on each of the two walls of the socket connector, a stud guiding recess in each of the two corresponding walls of the relay support and a recess for anchoring the stud in each of the two corresponding sides of the cover, such that progressive and flexible bending of the socket connector walls supporting the anchoring studs occurs during plugging-in.

* * * * *